Jan. 15, 1952     R. B. FOLEY     2,582,423
DUST COLLECTOR
Filed Aug. 3, 1949
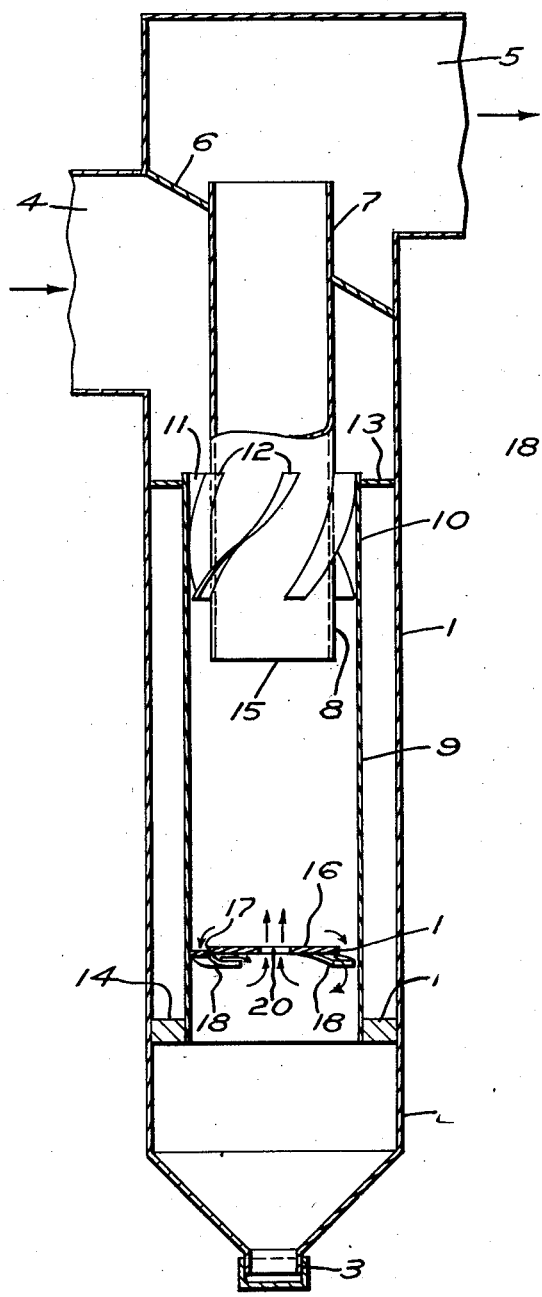
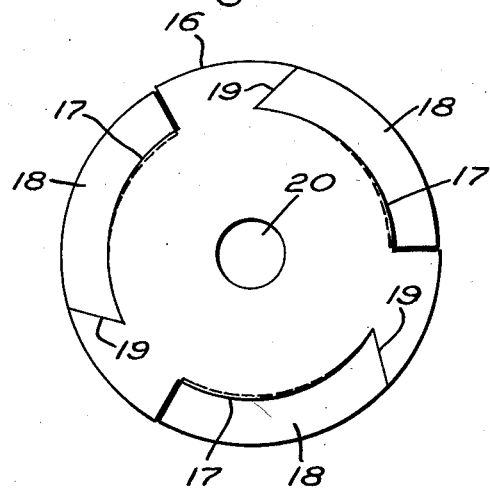
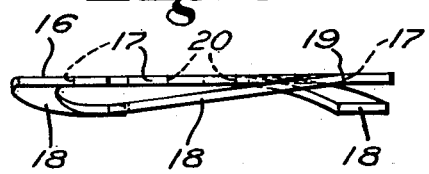
INVENTOR
Raymond B. Foley
By Andrew K. Foulds
his attorney Patented Jan. 15, 1952

2,582,423

UNITED STATES PATENT OFFICE 2,582,423

DUST COLLECTOR

Raymond B. Foley, Dearborn, Mich., assignor to American Blower Corporation, Dearborn, Mich., a corporation of Delaware Application August 3, 1949, Serial No. 108,261

3 Claims. (Cl. 183—80)

This invention relates to new and useful improvements in apparatus for separating foreign particles from a gaseous stream and more particularly to a dust collector.

An object of the invention is to provide a dust collector which will operate efficiently to separate foreign particles such as fly ash from a stream of gas in which they are carried.

Another object is to provide a dust collector with a baffle member which functions to segregate the foreign particles from the gas stream.

The invention consists in the novel structure and cooperative relation of parts to be more fully described hereinafter and the novelty of which will be particularly pointed out and distinctly claimed.

In the accompanying drawings to be taken as a part of this specification there is fully and clearly illustrated a preferred embodiment of the invention in which drawings:

Figure 1 is a view in vertical central section through a dust collector embodying the invention;

Fig. 2 is a detail plan view of a baffle member forming part of the invention; and Fig. 3 is a view in side elevation of the baffle member of Fig. 2.

Referring to the drawings by characters of reference, 1 designates generally a casing or housing having a hopper or chamber 2 at its lower end with a normally closed cleanout opening 3. The upper end of the casing 1 has an inlet 4 and an outlet 5 which are separated by an inclined wall or partition 6. Fitted in an opening through the wall 6 there is a clean gas outlet tube or duct 7 which has its outlet discharging into the clean gas outlet 5 and which extends downward into the casing 1 below the inlet 4. Surrounding the inlet portion 8 of this outlet tube there is a cylindrical collector tube 9 having its inlet end portion 10 in longitudinally overlapping relation to the portion 8 and annularly spaced therefrom to provide an annular inlet 11. In this annular inlet 11 and radially fitting between the tube portions 8 and 10 there is a plurality of vanes 12 which are inclined downward so as to cause the particle laden gas entering the inlet 11 to be given a helical rotation or spin. The tube 9 fits through an aperture in a supporting plate 13 which blocks off the space around the tube 9 within the casing 1. The lower end of the tube 9 is located and supported by plate members 14. Within the tube 9 in longitudinally spaced relation to the tube 7 and its clean gas inlet end 15 there is a baffle member 16 which is a generally circular plate or disk. Equally spaced around the periphery of the member 16 there are arcuate apertures 17, preferably three in number, through which the concentrated foreign particles and some gas pass downward for collection of the particles in the hopper 2. Underlying each of the openings or apertures 17, there is a guide vane 18 which extends from an end edge of each of the apertures and is inclined to the plane of the baffle member 16. The angle of inclination of the vanes 18 to the member 16 is preferably substantially equal to the angle of advance of the helical rotating gas stream. These members 18 are preferably cut along two sides from the member 16 and bent downward therefrom at their third side or end edge, as at 19, such that their outer arcuate or circumferential edges will have frictional engagement with the inside wall or face of the tube 9. These vanes 18 therefore serve the dual function of guiding the rotating stream and also of holding the baffle member 16 in position within the tube 9. The baffle member 16 also has a central opening 20 which provides an upflow port for passage of the clean gas therethrough from the hopper 2 to the outlet tube 7. The effective area of the peripheral apertures or total area of the opening at the ends of the vanes 18 is defined as the width of the individual vane members times the vertical deflection of the vane from the plane of the baffle member times the number of vane members. It has been found that a desirable operative ratio of the area of the center opening 20 to the total area of the openings at the ends of the vanes 18 is about one to one and four tenths.

In the operation of this collector which functions on the principle of the cyclone type of separators, the baffle member 16 is positioned longitudinally in the tube 9 just beyond the vortex point so that there will be a less pressure over the port 20 than on the apertures 17. Some means, of course, will be provided to create a pressure differential between the inlet 4 and the outlet 5, such, for example, as a fan or blower having its inlet connected to the outlet 5. The particle laden gas is supplied under this pressure differential to the inlet 4, and as it enters the annular inlet 11 and passes through this annular space, it will be given a helical rotation by the vanes 12. This rotating gas stream acting on the cyclone principle will throw the particles of foreign matter outward and downward along the inside wall of the collector tube 9. The central portion of this rotating stream will turn upward and enter the inlet 15 of the tube 7 for discharge through the outlet 5. The rotating stream will have its angle of advance reduced as it approaches the baffle member 16 such that the outer particle laden layer will be guided through the peripheral apertures 17 by the vanes 18. The quantity of gas which passes through the apertures 17 will be segregated from the foreign particles and be drawn upward through the port 20 as indicated by the arrows. The clean gas which is drawn upward through the port 20 will be pulled into the clean central vortex of the gas stream and discharged therewith through the tube 7 to the outlet 5.

Having thus described the invention, what is claimed and desired to be secured by Letters Patent of the United States is:

1. In a dust collector, a cylindrical collector tube having an inlet at its upper end, a clean gas outlet tube extending concentrically into said collector tube upper end, gas rotating vanes positioned between said tubes to cause spiral rotation of the gas supplied to said inlet, a substantially flat circular baffle member having a central opening therethrough and extending across said collector tube in spaced relation to said outlet tube, said baffle member having spaced circumferential openings therethrough and spaced flat circumferential edge portions between said circumferential openings, said circumferential openings extending through substantially the entire circumference of said baffle member, said edge portions substantially fitting against the side surface of said collector tube and being small in peripheral size relative to said circumferential openings, and elongated vane members forming frictional supporting arms underlying each of said circumferential openings, said vane members each being cut along an end and on a circular arc along a side edge from the stock of said baffle member and being inclined downward from the plane of the baffle member along a straight bend line at its other end at an angle to a radius of the baffle member such that the outer peripheral edges of said vane members extend slightly beyond the periphery of said flat edge portions and have frictional engagement with said collector tube thereby to support said baffle member.

2. In a dust collector, a cylindrical collector tube having an inlet at its upper end, a clean gas outlet tube extending concentrically into said collector tube upper end, gas rotating vanes positioned between said tubes to cause spiral rotation of the gas supplied to said inlet, a substantially flat circular baffle member having a central opening therethrough and extending across said collector tube in spaced relation to said outlet tube, said baffle member having spaced circumferential openings therethrough and spaced flat relatively small circumferential edge portions between said circumferential openings, said circumferential openings extending through substantially the entire circumference of said baffle member, said edge portions substantially fitting against the side surface of said collector tube, said baffle member having peripherally extending vane members, one adjacent each of said openings and extending across the path of downwardly spiralling gas, said vane members being bent downward only from the plane of said baffle member and operable to direct the spiralling gas through the space between the end of the vane member and the baffle member, the total area of the space between the end of the vane members and the baffle member being defined as the width of the vane member times the vertical deflection of the end thereof below the plane of the baffle member times the number of vane members, and the ratio of the area of said central opening to said total area being represented by a number between the limits 1.0 and 1.4.

3. In a dust collector, a clean gas outlet tube, a cylindrical collector tube having its inlet end portion surrounding the inlet end portion of said outlet tube, means to cause particle laden gas entering the inlet end of said collector tube to rotate, a plate-like baffle member extending across said collector tube in longitudinally spaced relation to said outlet tube, said baffle member fitting said collector tube and having equi-spaced arcuate peripheral apertures, said baffle member having peripherally extending vane members, one adjacent each of said peripheral apertures and extending away from one side only of the plane thereof and in the direction of flow of incoming gas, each of said vane members having its outer side edge frictionally engaging said collector tube to hold said baffle member in position, said baffle member having a central opening for return flow of gas which has passed through said apertures, the total effective area of said apertures being defined as the space between the end of said vane members and said baffle member and equal to the width of the vane member times the vertical deflection from the baffle member times the number of vane members, and the ratio of the area of said central opening to the total effective area of said apertures being represented by a number between the limits 1.0 and 1.4.

RAYMOND B. FOLEY.

REFERENCES CITED

The following references are of record in the file of this patent:

UNITED STATES PATENTS

| Number | Name | Date |
|---|---|---|
| 769,808 | Venderbush et al. | Sept. 13, 1904 |
| 933,566 | Kennedy | Sept. 7, 1909 |
| 2,480,243 | Hoadley | Aug. 30, 1949 |

FOREIGN PATENTS

| Number | Country | Date |
|---|---|---|
| 112,778 | Australia | Mar. 21, 1941 |